United States Patent
Ahroon

(10) Patent No.: US 9,842,373 B2
(45) Date of Patent: Dec. 12, 2017

(54) SYSTEM AND METHOD FOR ACQUIRING, COMPARING AND EVALUATING PROPERTY CONDITION

(75) Inventor: Erik Ahroon, Newport Beach, CA (US)

(73) Assignee: Mousiki Inc., Corona Del Man, CA (US)

(*) Notice: Subject to any disclaimer, the term of this patent is extended or adjusted under 35 U.S.C. 154(b) by 624 days.

(21) Appl. No.: 12/907,374

(22) Filed: Oct. 19, 2010

(65) Prior Publication Data

US 2011/0040692 A1 Feb. 17, 2011

Related U.S. Application Data

(63) Continuation-in-part of application No. 12/541,390, filed on Aug. 14, 2009.

(51) Int. Cl.
*G06Q 50/16* (2012.01)
*G06Q 30/06* (2012.01)
*G06Q 99/00* (2006.01)

(52) U.S. Cl.
CPC ....... *G06Q 50/163* (2013.01); *G06Q 30/0645* (2013.01); *G06Q 99/00* (2013.01)

(58) Field of Classification Search
CPC .. G06Q 50/163; G06Q 30/0645; G06Q 10/20; G06Q 20/10; G06Q 20/204
USPC .......................................................... 705/39
See application file for complete search history.

(56) References Cited

U.S. PATENT DOCUMENTS

| | | | |
|---|---|---|---|
| 5,504,674 A * | 4/1996 | Chen et al. .................. 705/4 |
| 7,533,805 B1 * | 5/2009 | Enright .............. G06Q 20/10 235/379 |
| 8,307,013 B2 * | 11/2012 | Ryu ................... H04N 5/232 707/803 |
| 8,538,841 B2 * | 9/2013 | Menke ........................ 705/35 |
| 2003/0093289 A1 * | 5/2003 | Thornley et al. ............... 705/1 |
| 2003/0190076 A1 * | 10/2003 | DeLean ..................... 382/209 |
| 2004/0138896 A1 * | 7/2004 | Cheng .......................... 705/1 |
| 2005/0071201 A1 * | 3/2005 | McNasby ..................... 705/4 |
| 2005/0144018 A9 * | 6/2005 | Aptekar ....................... 705/1 |
| 2006/0173707 A1 * | 8/2006 | Schubert et al. .............. 705/1 |
| 2006/0184440 A1 * | 8/2006 | Britti et al. .................. 705/35 |
| 2007/0027735 A1 * | 2/2007 | Rokos ........................... 705/7 |
| 2007/0156429 A1 * | 7/2007 | Godar .......................... 705/1 |
| 2009/0083093 A1 * | 3/2009 | Colletti ........................ 705/7 |
| 2010/0241507 A1 * | 9/2010 | Quinn ................. G06Q 30/02 705/14.42 |

OTHER PUBLICATIONS

Christmann, Samantha "Photos Help to Recoup Security Fee," May 18, 2009 Buffalo News.*

* cited by examiner

*Primary Examiner* — Bruce I. Ebersman
*Assistant Examiner* — Kevin Poe
(74) *Attorney, Agent, or Firm* — Erik Ahroon

(57) ABSTRACT

A system and method is provided for acquiring, collecting, comparing and evaluating the condition of rental property at several time periods during a lease or rental agreement. A deposit amount that is returned to a rentee or owed by the rentee is determined by a computer or individual based on a comparison of the documentation provided by the rentee and/or renter at the start of the rental period to the documentation that is provided the end of the rental period. The documentation provided by the rentee and renter is time-stamped and imprinted with geo-location information if it is available.

17 Claims, 3 Drawing Sheets

SYSTEM AND METHOD FOR ACQUIRING, COMPARING AND EVALUATING PROPERTY CONDITION

CROSS-REFERENCE TO RELATED APPLICATIONS

This application is a continuation-in-part of and claims priority to U.S. application Ser. No. 12/541,390, filed Aug. 14, 2009, all of which is herein incorporated by reference.

FIELD OF INVENTION

The present invention relates to the field of renting property, including real and personal property. More specifically, the invention relates to the technical field of acquiring, comparing and evaluating property conditions at the start of the rental and at the conclusion of the rental period.

BACKGROUND OF THE INVENTION

Renting is a part of life. It's something that many people experience at some point in their lives. The concept of renting may involve real property or personal property. With personal property, the cost of renting is usually less than the actual value of the property being rented.

A "renter" or "leasor" refers to a person, group of people or an entity that is renting or leasing real or personal property to another party, namely a rentee or leasee. A rentee or leasee refers to a person, group of people or an entity that is renting or leasing property from a renter or leasor. The renter must have a certain degree of trust in order to rent to a rentee. This is overcome for the most part through a security deposit. For example, when renting a power tool at a rental center, the renter may ask the rentee to leave an open credit card slip or may ask for cash or may simply ask for a driver's license. With real property rentals, there is also usually a security deposit in place in case of a skipped payment or excessive cleaning fees. Many people have their first experience with security deposits when they move away to college and need to rent a dorm room or apartment. As is often the case, the security deposit is paid but either a portion or all of the security deposit is not returned at the conclusion of the rental period.

Some common reasons that renters justify keeping this money is because of cleaning fees, missing items or simply items not being returned in the same condition that they were lent. For example if a renter claims that the rentee damaged the property, one way that a rentee can respond is to show evidence in the form of lists, marked diagrams, notes, pictures etc., all determined at in the beginning of the rental period. Often times, the rentee is not legally savvy enough or simply not conscientious enough to collect this evidence at the appropriate times. The end result being that the rentee loses part or all of the deposit.

Thus, there exists a need for a system and method of collecting this evidence at the appropriate times and securely storing the evidence. Furthermore, there exists a need to be able to determine an amount of the deposit based on a comparison between a condition of the rental property at the start of the rental period to a condition of the rental property at the conclusion of the rental period. As presently disclosed, this system will preferably be able to create a differential image(s) or a differential list, which cites or makes evident the differences in the two conditions. Even more, this system could also possess the ability to identify the items and evaluate the differences in conditions and the differences in price. This could also correlate to a percentage of any deposit amount that had been paid.

SUMMARY OF THE INVENTION

The present invention relates to methods for determining an amount of a deposit that will be returned to or owed by the rentee by evaluating conditions of the rental property at the commencement of a rental agreement to conditions of the rental property at the conclusion of the rental period. In some embodiments, determining the condition of the property may be implemented on a general purpose computer, system and/or server. In other embodiments, a rentee utilizes a camera or video recorder, a general purpose computer with internet connection and a website that contains secure personalized pages for different users. Additionally, a server computer (which may host the website) executes software for processing the information for determining the condition of the property at specific time periods.

One aspect of the invention provides a method for determining an amount of a deposit associated with rental property that will be returned to a rentee, the method comprising receiving and storing first documentation about condition of the rental property before a rental period, receiving and storing second documentation about condition of the rental property at termination of the rental period, comparing the first documentation to the second documentation to determine if there is any damage to the condition of the rental property, determining one or more deductions based on the resulting damage, and determining an amount of the deposit that will be returned to the rentee based on the one or more deductions.

DETAILED DESCRIPTION OF THE PREFERRED EMBODIMENT

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
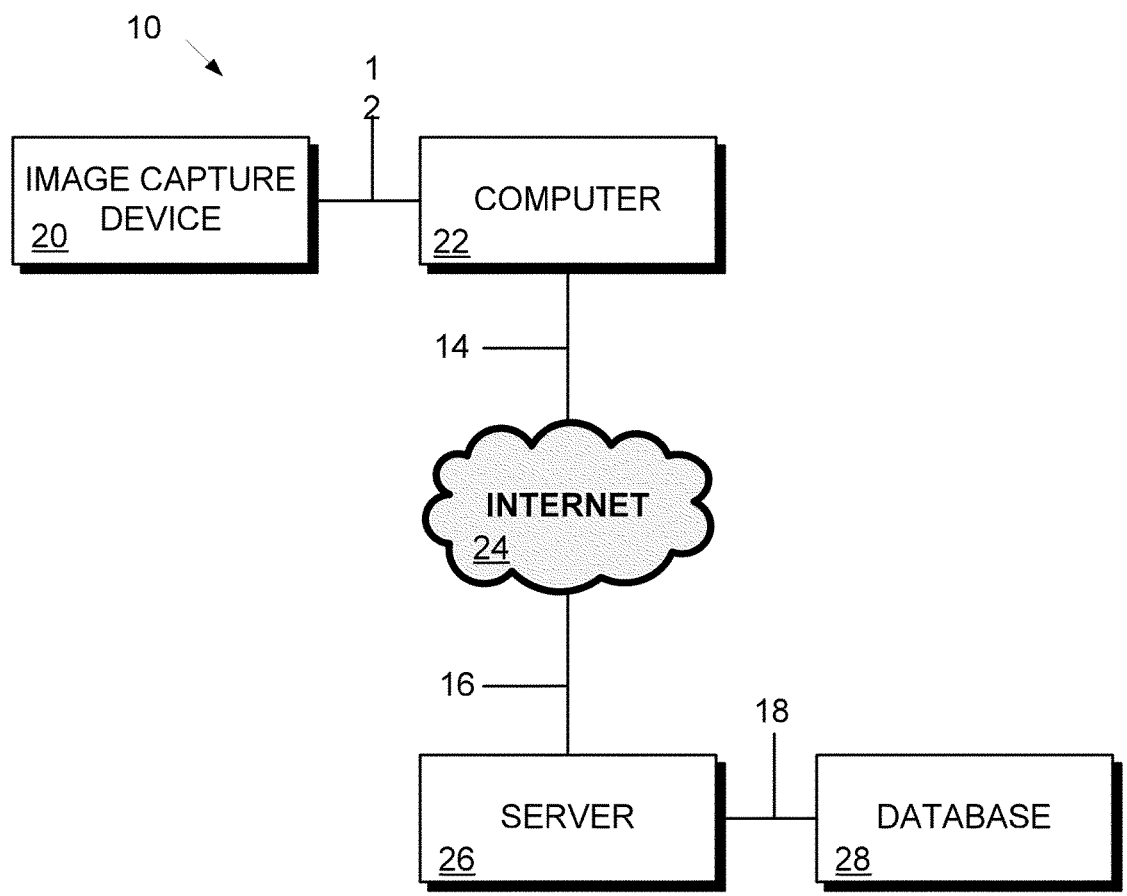
FIG. 1 is a block diagram showing one aspect of the present invention depicting an exemplary system for implementing the present invention.

Referring to FIG. 1, system 10 depicts a system that is used in determining property condition and for determining the remaining deposit that is refunded or owed. 20 is an image capture device or image capture system such as a digital camera, camera phone, VCR, digital video camera, analog video camera with an analog-to-digital converter, analog camera with an analog-to-digital converter, scanner, 3D scanner, or any device or system that is capable of capturing an image thru an optical lens and provides a digital representation of the image. A GPS receiver may also be optionally included in the image capture device 20.

Image capture system 20 may comprise one or more digital or analog cameras or video cameras arranged or configured to capture different views of rental property. In one embodiment, a photography station or booth may be set up to capture different views and angles of the outside of a rental vehicle. The rental vehicle could be driven into the photography station, and separate cameras would capture images of the front, back, two sides, top and bottom of the rental vehicle. Alternatively, a camera could be mounted to a robot where the camera would move around the rental vehicle and take separate shots or a continuous video of the condition of the rental vehicle. When the driver of the rental vehicle is checking out at the rental gate, the images could be printed out and provided to the driver. Alternatively, the images could be uploaded to the website of the company renting the vehicle which could be accessed by the driver via the internet. Another alternative is to have the images printed and put inside the rental vehicle so that driver could inspect the vehicle and make any special notations on the images. The images could then be scanned by the person at the rental gate so that the company would be aware of any condition issues before the driver exits the rental lot.

22 is a computer device, system and/or server that includes but is not limited to one or more processors or CPUs, hard disks, memory systems and devices, system buses, keyboards, display devices, and optional I/O ports such as Bluetooth, Wireless such as IEEE 802.11, VGA, SVGA, HDI, USB, Ethernet, Serial, Parallel and optional proprietary ports (all not shown). 22 can have any computer configuration, and can be an fixed location computer, or a moveable computer such as a laptop or an iPad. The CPU or processor is operatively connected to memory. The memory system or device(s) would contain one or more programs that are adapted to be executed by the CPU or processor. 22 includes a connection to the internet 24 such as a modem or local area network connection through which the internet 24 may be reached. 22 may optionally also be configured to operate 24 hours a day, 365 days a year. As used herein, a server computer is a computer, or series of computers, that link other computers or electronic devices together. They often provide essential services across a network, either to private users inside a large organization or to public users via the internet.

Computer 22 and image capture device 20 may be separate devices and systems. However, in alternative embodiments, computer 22 and image capture device 20 may be integrated into one system or one device, such as a phone or a digital camera, for example.

24 depicts the internet. The internet 24 includes any and all switches, routers, hubs, modems, cable modems, wireless access points, computers, servers, and all wired or wireless connections and any other devices, physical connections (wires) or wireless connections that enable a connection to and throughout the internet. The internet also includes a global system of interconnected computer networks that use protocols to serve billions of users worldwide. It is a network of networks that consists of millions of private, public, academic, business, and government networks, of local to global scope, that are linked by a broad array of electronic and optical networking technologies. The internet carries a vast range of information resources and services, such as the inter-linked hypertext documents of the World Wide Web (WWW) and the infrastructure to support electronic mail.

26 is a computer device, system and/or server that comprises similar components as computer 22. 26 connects to the internet 24 and one or more databases 28. 26 may optionally also be configured to operate 24 hours a day, 365 days a year. Optionally, in such cases, multiple hard drives may be implemented in a RAID configuration and other configurations for heat dissipation and power may be used as is known in the art of server computers. 26 may be configured and/or optimized to execute a web server such as a Microsoft IIS Server, or Apache Server.

28 is a computer device, system and/or server such as in 22 and 26. 28 may be configured and/or optimized to also execute, for example, a database program such as MySQL, Oracle, SQL, or any other database software program on the market. 28 is an optional computer because 26 may be configured to also execute a database software program. Although server 26 and database 28 are shown separately in FIG. 1, server 26 and database 28 may be combined into a single unit, device and/or system.

22, 26 and 28 may be a single or multiple computer devices, systems and/or servers. For example, 22 may comprise a single computer device, system or server, while 26 may comprises multiple servers 26. In another example, 22 may comprises multiples servers and 26 may also comprise multiple servers. If multiple computer devices, systems and/or servers are used, such devices, systems and/or servers can be local and/or remote to each other.

12, 14, 16, and 18 are communications links. Data messages from or to any of the elements 20, 22, 26, and 28 may travel on a wire (landline) or wirelessly. Communications links 12, 14, 16 and 18 in some embodiments are wired communications links and can include analog, digital and optical links. In some embodiments, communications links 12, 14, 16, and 18 may be standard wireless cellular phone connections as is known to those skilled in the art. In other embodiments, communications links 12, 14, 16 and 18 may be EV-DO, GPRS or other data links across a cellular communications network.

In another alternative embodiment, communications links 12, 14, 16, and 18 may be standard Ethernet communications links. In each of the communication links 12, 14, 16, and 18 embodiments, described herein there may be switches, routers, hubs and servers, not shown in FIG. 1. Depending on the type of communications links 12, 14, 16, and 18 selected, the elements 22, 26, and 28 will have the necessary hardware and software to communicate across the selected type of communications links 12, 14, 16, and 18. Communications links 12, 14, 16, and 18 may all or partly be secure links and may use encryption. Communications links 12, 14, 16, and 18 may be any combination of link type described above.

Figure 2:
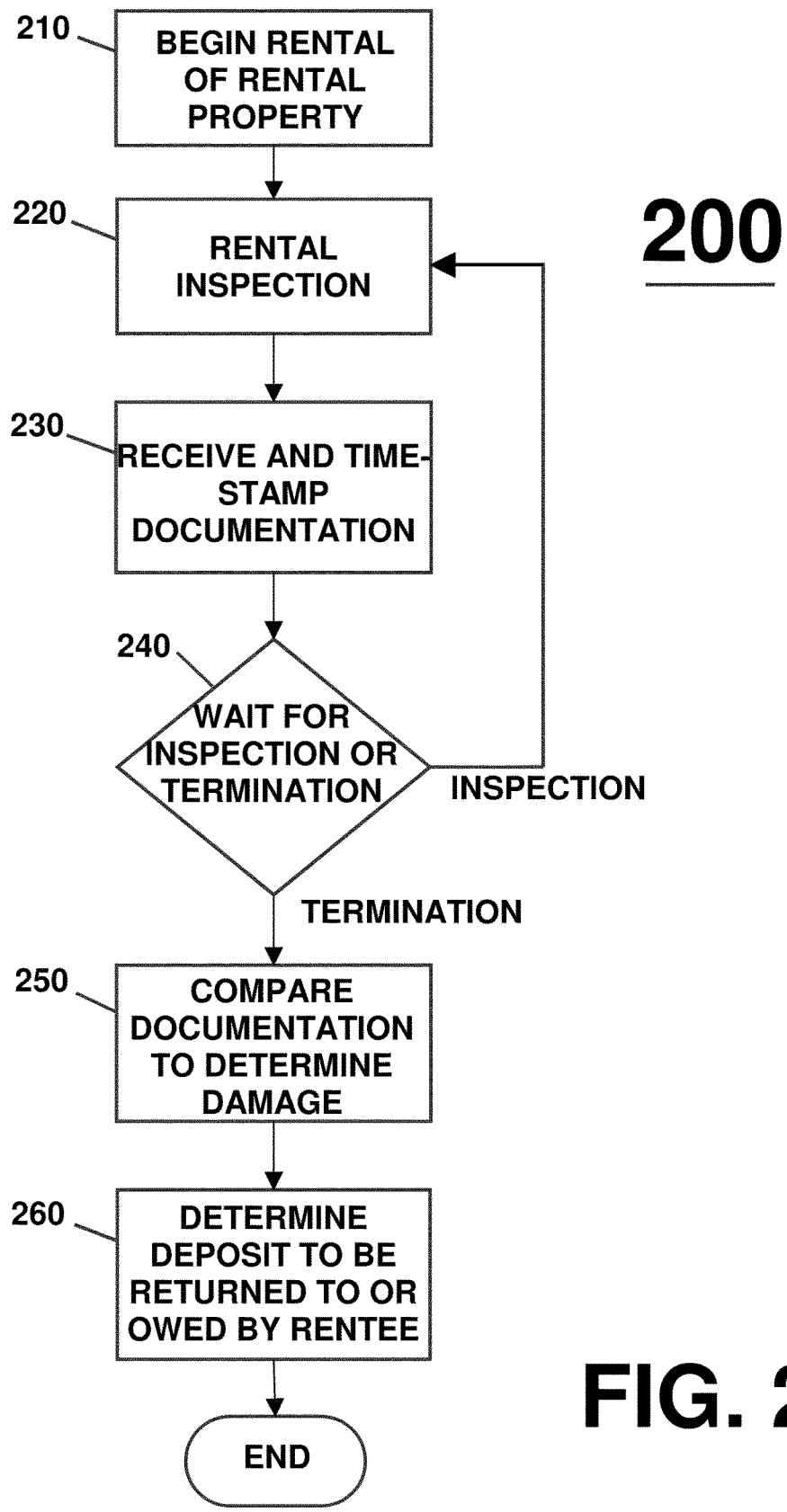
FIG. 2 is a logic flow diagram of a method showing one aspect of the present invention, for determining the remaining deposit using document information.

FIG. 2. depicts a process or method 200 for determining a deposit that will be returned or refunded to the rentee, or that will be owed by the rentee at the conclusion of a rental period using information provided by the rentee and/or renter. The process may be performed, for example, by the system shown in FIG. 1. For example, the process elements in FIG. 2 may be executed individually or in combination with an image capture device 20, general purpose computer 20, server computer 26, or database computer 28. In other words, any of the process elements in FIG. 2 may be executed on any of the elements in FIG. 1, individually or in combination.

The method or process 200 shown in FIG. 2 is applicable to all types of personal or real property rentals. This includes, but is not limited to, vehicles, cars, airplanes, trucks, sport utility vehicles, vans, buses, train cars, boats, motel rooms, hotel rooms, rooms in cruise ships, apartments, condos, cabins, houses, stores, offices, any other place that may be for rent/lease, and all types of personal property such as household or business devices or items, gardening tools, building tools, moving tools and every other tool, furniture, device and/or item that a party may offer for rental or lease, The method or process 200 of FIG. 2 is also applicable to long (e.g., monthly, yearly) or short term rental periods (e.g., daily, weekly).

Figure 3:
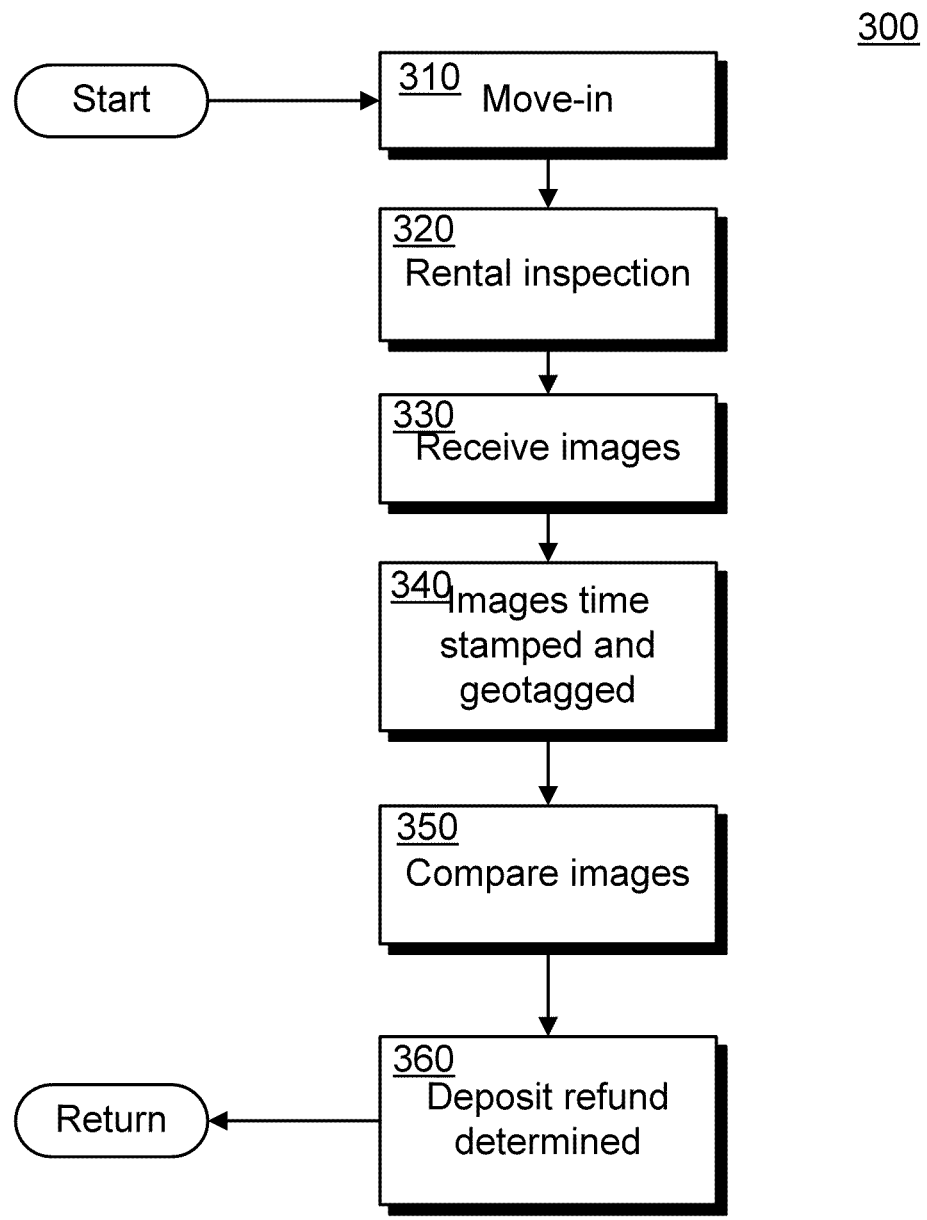
FIG. 3 is a logic flow diagram of a method showing one aspect of the present invention for determining the remaining deposit using image comparison.

The method or process 200 of FIG. 2 and of method 300 of FIG. 3 are also applicable when the deposit consists of an amount of money (that is either paid upfront or over a period of time), or when there is no deposit (e.g., no deposit is typically required for renting a rental car) or the deposit is zero. When the deposit is equal to zero or when the deposit is insufficient to cover the damages made by the rentee to the rental property, then any damage that is found at the conclusion of the rental period will be owed by the rentee.

In block 210, a rental of personal or real property commences. This usually occurs after the terms of the rental agreement have been agreed to (and signed if a written agreement) between the renter and the rentee, including upfront deposit, rental period and what is being rented, and after the appropriate deposit or payment has been made. For example, a rentee rents an apartment and moves in or executes a lease or rental agreement on a certain date. In alternate embodiments, this could also indicate a move-in date for a mortgaged property (ie. house, store, etc.), a rental date for personal property, such as the date a rentee rents a power tool, or the commencement of a lease.

In some embodiments, in the commencement of the rental may also indicate that an account is created for the rentee and initial information about the rentee is entered, uploaded and/or stored into a computer server by the process. The server receiving this information may be associated with the entity providing the rental or may be associated with an independent company, such as www.Renti.com for example. Information that is uploaded and stored in server 26 includes, but is not limited to, items such as the original security deposit amount (a fixed, varying or zero amount), the rentee's name, address and other contact information, deposit amount, start and termination dates of rental period, whether rental payment is one time, weekly, monthly, yearly, when the rental agreement was signed, and any other information that may be helpful in identifying the rentee or renter. The actual signed rental agreement may be uploaded and stored on the server 26. Block 210 is an optional block and may not be included in all embodiments where the presently described system and method are used.

In another example, suppose rentee is renting a condo from a multinational company with condos all over the world. Before the rental period begins, the company creates an account in its servers for the rentee or as provided by an independent website/company. The account may include an account name and an initial password. The company stores basic information about the company and the condo being rented, including for example, the company's name, address, contact information, a layout of the condo, the general condition of the condo, and images of the condo as taken by the company prior to the rental period to rentee. When the rentee logs on, the rentee can access the information previously stored by the renter prior to the rental period and store additional information including images as provided in method 200.

In block 220, a rental inspection of the rental property is performed by the rentee. Block 220 is performed at the beginning and end of the rental period. Block 220 also may be performed at any time during the rental period. Block 220 may include determining which conditions will need to be documented. The type of documentation may include fixed images, video and/or written documentation. The inspection may be random or ordered according to some type of a checklist, a step by step inspection list, or any other way that a rentee would inspect the rental property. The inspection may also be computerized and may prompt the rentee to do specific tasks, or alternatively, may prompt the rentee via rentee's phone to execute a series of tasks, having prompts for answering any questions that may be posed.

At the beginning of the rental period, the renter may provide the rentee with a list of problems that would result in some type of deduction from the deposit. The list may show a percentage deduction or a flat rate deduction from the deposit. For example, the list may show that a carpet stain having a diameter of under a foot would have a deduction of $50, a carpet stain having a diameter of over a foot would have a range of deduction from $100-$500, while multiple stains of over a foot would mean 50% deduction from the deposit. This list will help the rentee to understand what type of damage to the rental property corresponds to a larger deduction. The rentee then can try to avoid damage to the rental property where there is a larger deduction.

In the preferred embodiment, the rentee randomly shoots images of the rental property using a camera or video camera 20. There are no specific guidelines provided by the renter. The images shot by the rentee can be of any angle of the rental property and are then uploaded to the server and time-stamped in block 230.

In another embodiment, the rentee may be provided general or specific instructions or suggestions by the renter on what to take and how to document the initial condition of the rental property at the beginning of the rental period. The instructions may include a written or electronic checklist, step by step instructions or any other types of guidance. These instructions may also include instructions about what images to take, where to stand, and which direction to point the camera. For example, the instructions may show a layout of the rental property, what location to stand as designated by a series of numbers (the first number representing the first location that the rentee should stand), and an arrow pointing in the direction that the image should be taken. Multiple images may be taken by the renter and all or some of these images will be uploaded to the server.

In another embodiment, the rentee may fill out a check list indicating the condition of rental property or each of the items being rented. For example, in the real property rental example, the rentee may indicate stove [not working], refrigerator [OK], carpet stains master bedroom [yes]. These responses may be checked off on a sheet of paper, and then they are scanned and uploaded to server 26 in block 230.

In another embodiment, such as involving the rental of real property (e.g., apartment, condo or house), the renter would provide the rentee with a handheld computer and camera unit (CCU) that has GPS capabilities and is capable of being wirelessly coupled or connected to the server 26. The CCU may be a single device that combines the capabilities and functions of the image capture device 20 with a computer 22, or may be similar to an iPad which is coupled to a camera. The server 26 would then prompt the rentee via the CCU to physically move to specific locations throughout the rental property using commercially available GPS location techniques and applications, and to take pictures in a certain direction or orientation. The resulting images or some set thereof taken by the rentee would then be uploaded to the server.

In a similar example of a rental of real property, instead of providing the rentee with a CCU, the renter would obtain the phone number of the renter's smart (cell) telephone or hand-held computer such as an iPad. The smart phone and/or hand-held computer would also need GPS and camera functionality. Either the server would initiate the call to the rentee or the rentee would call a phone number associated with the server. Whereupon a connection between the server and the smart phone, an application would be initiated and executed on the smart phone, Similar to the above example, the server would prompt the rentee's smart phone to move to specific locations throughout the rental property to take photos, upon which the photos would be uploaded to the server.

In another embodiment, a checklist could be provided by the computer device or server where the rentee provides answers to questions. The computer device would ask for example whether the refrigerator was working, and would provide a yes/no prompt to the rentee to answer. The computer device would then prompt whether there was any damage to the refrigerator, providing a yes/no prompt to the rentee to answer. These prompts would cycle through every room of the rental property, providing an easy way for the rentee to record if there were any issues with the rental property. If a major problem was noticed, the computer device may prompt for an image to be taken with an image capture device and may even provide notice to the renter about the need for scheduling a repair. The answers to the questions and any images taken would be uploaded to the server in block 230.

In yet another embodiment, an outline of the rental property would be provided to the rentee, either in written form or some type of computerized document. The rentee would place/select a number where there were problems and then write/enter a brief description of the problem which would be associated with the number. If a computerized outline was used, a bubble may pop-up, where such pop-up could then be filled-in with a description of the problem. The computerized outline may also provided a list of common problems which could be selected.

In the example of the rental of a car, the rentee may drive in to the photography station or booth where cameras will take images of the car. The images would be uploaded to the server and possibly to the rentee's cell phone or computer. When the rentee stops at the rental gate for verification, the images taken by the photography station could optionally be provided to the rentee as verification of the condition of the rental vehicle at the start of the rental period.

As can be seen from these examples, there are may different ways to perform an inspection of the rental property. It ranges from simple notations on a piece of paper, taking images of the rental property to computerized interactions. The information that is gathered and used by the rentee to document the condition of the rental property is referred to as "documentation". Documentation may include all forms and all types of electronic or written documentation as well as any images (still/video) that may be taken of the rental property.

A rental inspection will most likely be performed at least twice, once upon the start of a rental agreement and once upon terminating or ending a rental agreement. However, a rental inspection can occur at any time during the term of the rental period. For example, another inspection can occur after a flood or hurricane or other significant event. The renter may also perform an inspection of the rental property before it is rented and at the conclusion of the rental period. There may be two sets of documentation, one set from the renter and one set from the rentee.

In block 230, the documentation from block 220 are received by the server and/or database. In some embodiments this is performed image capture device 20 uploading the documentation via computer 22 to the server and/or database. In alternate embodiments, electronically formatted documents such as word documents, adobe PDF documents, CSV documents, text documents, or responses to an electronic questionnaire delivered by computer 22 via a website hosted on server 26 or database 28.

Once the documentation is received in block 230, it is time stamped with the date and time that it is received by the server and/or database. If geolocation information is available on the device that shot the images and/or video, then this information is also provided and stored in the server and/or database. Having the images and documents time-stamped helps to prevent fraud. The renter cannot claim that the damage to the rental property did not exist if the images shot by the rentee at the beginning of the rental period shows such damage. Geolocation information in relation to real property for rent, will help to verify that the images/video taken pertain to the rental property and not to property that is not subject to the rental agreement (i.e., property that is identical to the rentee's rental property but is not the rental property that actually is the subject of the rental agreement).

The documentation may be permanently stored in the server until after the conclusion of the rental period and the calculation of the deposit. By preventing the time-stamped documentation from being erased or deleted, it will help protect the renter and rentee in a fair and equitable resolution to any disputes about condition of the rental property and determination of the deposit.

In block 240, method 200 waits until there is another inspection or the rental period has been terminated. If the rentee wants to perform another rental inspection, which may include documentation and/or images, then method 200 returns to block 220 where the rental inspection 220 is performed as described above. The rentee/renter can perform as many rental inspections during the term of the rental period, if there are conditions that have changed to the rental property and are conditions that the rentee would like to document. At the conclusion of the rental period, it is preferred that the final rental inspection would be performed by the rentee. However, the renter may perform the final rental inspection if the rentee was unable or unwilling to do so.

After the final rental inspection has been performed and the rental period has ended, block 250 compares the documentation at the start of the rental to documentation at the end of the rental. The comparison can be manually performed by the renter, a third party who may or may not be independent, or it may be computerized. Any documentation that was previously received can be compared by the process 200 and the results returned to the server/computer, the rentee and/or renter. For example, documentation at the start of the rental will be compared to documentation at the end of the rental period. Additionally, the results of the comparison could be sent to a landlord, rentee, title company, attorney or interested third party or any combination of the above via an email, electronic alert or snail mail.

When the renter and rentee both provide documentation at the start and end of the rental period, the comparison also involves making an accurate determination of the rental property at different time periods by resolving discrepancies between the documentation provided by the renter and rentee. For example, when determining the condition of the rental property at the start of the rental period, the computer system may look for documentation that is as close as to the date of the start of the rental. If the renter provided documentation that dates to two months before the start of the rental; while the rentee provided documentation that dates to one day before the start of the rental. The system, computer or server would determine that more credence should be given the rentee's documentation since the date of the documentation is closer than the date of the renter's documentation. Similarly, at the end of the rental period, if there are discrepancies between the documentation provided by the renter and rentee, the system would have to resolve what damage was actually caused by the rentee or the renter. Resolving these discrepancies is key to finding a fair and equitable solution to the amount of the deposit to return to the rentee and having enough money to repair or replace the damage to the rental property.

The results of the comparison would provide information and details about what damage has occurred to the rental property. The results may be in the form of a list or table, detailing the amount of damage, the location of the damage, whether such damage is minor or major, and indicating or highlighting portions of an image to support the damage claim.

In some embodiments, document comparison comprises comparing responses to a check list. For example, if the process receives a rental property checklist the day a tenant/rentee moves into a property and then receives the same rental property checklist from the property manager upon the end of the rental period then the process will compare the responses for each item. Specifically, if the tenant/rentee indicates in the rental property check list, on the move in date, that the refrigerator is OK on the check list then the process will compare the status of the refrigerator for the document that was received by the process at the end of the rental period from the rental property manager. If the property manager indicates the refrigerator as broken then the compare process will flag this difference and store this difference in a memory. In alternative embodiments, many documents may be stored in server 26 or database 28 and used as a baseline in comparing documents.

In another embodiment, the comparison may be performed by the server/computer. In the case of a checklist, the server/computer would be able to compare the answers by the rentee and renter to determine what had changed. The differences would be noted for the next step 260. In the case of images and video, the server/computer would first align images that are alike, and then determine if noticeable damage can be found. If so, the differences would be noted and sent to the rentee and the renter. There is commercially available software for comparing images, including for example, Merge by Araxis, Image Comparer by Bolide Software and Abonsoft Image Compare.

In block 260, when damage is found to the rental property, a deduction or value is assigned for each occurrence of damage to the rental property. Block 260 also calculates the total deductions and the resulting deposit to be refunded or amount owed. In some embodiments, each item in a rental property checklist may be stored in a database such as database 28. Additionally, standard amounts for damage to each item may also be stored in database 28. For example, one item may be a refrigerator. If a difference is flagged for the refrigerator, in block 250 then a standard sum of money such as $100.00 may be automatically deducted from the security deposit. For example the deposit refund is determined by subtracting $100.00 from the original security deposit that was paid by the tenant/rentee. In this example block 260 may also automatically pay the remaining deposit refund via an electronic payment service such as PayPal or check may be made out to the tenant/rentee for the remaining deposit amount and sent via snail mail.

The deduction or value assigned to each occurrence of damage to the rental property may be a flat rate or a percentage of the total deposit. These value are then summed and subtracted from the deposit. The remaining amount after the subtraction is the deposit that will be returned to the rentee. In some case, the damages may exceed the deposit, where the rentee will receive no deposit and may be forced to pay an additional amount to reimburse for the excessive damages.

FIG. 3. depicts a process 300 for determining the remaining deposit using image information. The process may be performed, for example, by the system of FIG. 1. For example, the process elements in FIG. 3 may be executed individually or in combination with an image capture device 20, general purpose computer 20, server computer 26, or database computer 28. In other words, any of the process elements in FIG. 3. may be executed on any of the elements in FIG. 1. individually or in combination. Block 310 is similar to block 210 and will not be discussed again.

In block 320 a rental inspection is performed. This is similar to what was described in relation to block 220 of FIG. 2. In some embodiments, a rentee may perform a rental inspection by using an image capture device 20 to capture images of the rental property. A rental inspection may be performed at least twice, once at the beginning of the rental period called a first image or first set of images and then later upon termination or end of a rental agreement called a second image or second set of images.

In block 330, the images captured from block 320 are received by the server and/or database. In some embodiments this is performed by taking digital pictures and uploading them via a computer to a website. In some embodiments geotagging, time and date information may be included with the images stored in server and/or database. Block 330 is similar to what was described in block 230 of FIG. 2.

In block 340, the images are geotagged, time and date stamped if this information is not already included with the stored images. In some embodiments the geotagging process comprises using software such as the OziPhotoTool which can be found at http://www.oziphototool.com. In other embodiments the geotagging process may be embedded into an image capture device 20. The time and date stamping process usually occurs within an image capture device 20 but may also be performed by software executable separate from the image capture device 20.

In block 350, the images are compared by server/computer/database. In some embodiments, this is performed digitally using a pixel scanner. It can also be performed using an optical sensor or any other techniques known in the art. In other embodiments, the image comparison may be performed by software known as Compare Suite by AKS-LABS (http://www.comparesuite.com). Once the images are compared, they are sorted so that a person may compare the sorted images. Each of the sorted images is compared to each other to determine the before and after images. For example, in a real property rental the rentee will capture one or more first images upon move-in, then these first images will be compared to second images of the same items upon termination of the lease. If there are differences between the images, then these differences are flagged. This may be a manual process (as performed by a person who looks and examines the photographs) or may be computerized. In alternative embodiments, the previous captured images may be stored in server 26 or database 28 and used to form a baseline to be used in the comparison.

In block 360, the appropriate deposit can be calculated and returned to the rentee. In some embodiments, each item in a rental property image list may be stored in database 28. Additionally, standard amounts for damage to each item may also be stored in database 28. For example, one item may be a refrigerator. If a difference is flagged for the refrigerator, in block 350 then a standard sum of money such as $100.00 may be automatically deducted from the security deposit. For example the deposit refund is determined by subtracting $100.00 from the original security deposit that was paid by the tenant/rentee. In this example block 360 may also automatically pay the remaining deposit refund via an electronic payment service such as PayPal or check may be addressed to the tenant/rentee for the remaining deposit amount and sent via snail mail.

EXAMPLE 1

A college student rents an off campus apartment for the semester. Before moving in all her belongings, she uses her smart phone to take pictures of the inside of the apartment, including the walls, flooring, cabinetry, appliances, and any furnishings. She then logs on to a secure website and uploads her images to her account. The system stamps or records the time and date that the images were shot and incorporates the location coordinates based on the address provided by the student or via an integrated GPS unit. At any point, the student can view her profile and input the amount of her security deposit that was paid to her landlord. At the end of the semester, she again takes pictures of the same places and objects to record any changes in condition. The system can suggest an amount of security deposit that could be retained by her landlord. She may also choose to allow access to the images to her landlord, family or a legal advisor.

EXAMPLE 2

A family purchases their first house that has just been built. They call a professional who works for the business using the disclosed system to come out periodically and record the progress of the construction. The professional brings a camera that can geo-tag and time-date stamp the images at the moment they are taken. Later, the images are uploaded to the families account. Five years later, the family has flooring that buckles up from the ground. The builder alleges that the family caused the damage by excessively watering their yard. The family can then use images from the construction to show that an adequate water barrier was never laid under the foundation.

EXAMPLE 3

A businessman flies out of town to give a three day presentation. At the airport, he rents a car, deciding not to purchase the additional insurance, and uses his digital camera to take pictures of the car's condition. The car has a minor scratch in the passenger door and a minor ding in the rear bumper. He signs in to his account at the rental agency and they upload the pictures. During the trip, he notices a car backing out next to him possibly grazes the passenger side. He can not tell if this caused any extra scratching. After he returns the car, he again takes pictures of the car's condition, logs in to his account and can show the rental agency that the identical scratching was already present when the car left the lot.

EXAMPLE 4

Honeymooners are vacationing in Hawaii when they decide to windsurf for a few hours. They find a rental hut and pay a $50 deposit to return the sail boards. The rental hut quickly videos the boards, logs in to an account set up for al their customers and uploads the videos. They then accept the deposit amount and have the couple sign a liability agreement before taking the boards out. While in the water, the wife falls and the husband paddles over to assist her. In the process, the mast from her sail pierces his sail and causes a small tear. The boards are returned and again the rental hut videos and uploads the images. The system calculates the amount of damage based on the clips and a set price for the boards and sails. It determines that the couple owes an additional $100 beyond their deposit for the accident.

EXAMPLE 5

A woman is driving on her way to work in heavy rain. The car behind her is unable to see and crashes into her. She is not hurt and happens to have a camcorder on her PDA. She videos the condition of both cars and the occupants of the car that hit her, along with their conversation. After quickly texting her insurance company of the accident, they can login to her account and view a real time streaming video that is being transmitted in order to better assess the situation. The woman then gets a copy of the other driver's insurance and continues on her way to work.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described apparatus and techniques. Thus, the spirit and scope of the invention should be construed broadly as set forth in the appended claims.

What is claimed is:

1. A method implemented by a server connected to the Internet for determining an amount of a deposit associated with rental property that will be returned to a rentee or owed by the rentee, the method comprising:
   guiding, through a Computer and Camera Unit (CCU), a rentee to capture a first documentation during commencement of a rental period, wherein the first documentation comprise images of a rental property and each image of the first documentation includes geotag, time and date information, and wherein the images of the first documentation are captured in pre-determined directions and orientations at multiple geographical locations of the rental property, and wherein the multiple geographical locations are shown to the rentee by a Global Positioning System (GPS) of the CCU;
   receiving, by the server, the first documentation showing a condition of the rental property during commencement of a rental period;
   guiding, through the CCU, the rentee to capture a second documentation during termination of the rental period, wherein the second documentation comprise images of the rental property and each image of the second documentation includes geotag, time and date information, and wherein the images of the second documentation are captured in pre-determined directions and orientations at multiple geographical locations of the rental property, and wherein the multiple geographical locations are shown to the rentee by the GPS of the CCU;

receiving, by the server, the second documentation showing a condition of the rental property during termination of the rental period;

the server finding a match between corresponding images of the first documentation and the second documentation, based on the geotag, time and date information embedded in the images of the first documentation and the images of the second documentation;

the server comparing the matching corresponding images, from the first documentation and the second documentation for identifying one or more rental property problems related to the condition of the rental property after the termination of the rental period, wherein the matching corresponding images of the first documentation and the second documentation relates to same views of the rental property;

the server assigning a monetary value associated with each of one or more deductions based on the identified one or more rental property problems related to the condition of the rental property; and the server calculating an amount of the deposit that will be returned to the rentee or owed by the rentee based on the one or more deductions.

2. The method of claim 1, wherein said calculating is based on flat rate deductions for each occurrence of damage.

3. The method of claim 1, wherein the first documentation includes a first video of the rental property and the second documentation includes a second video of the rental property.

4. The method of claim 3, further comprising comparing the first video to the second video to identify the one or more problems related to the condition of the rental property.

5. The method of claim 1, wherein the first documentation includes a first checklist including questions about the condition of the rental property and answers received from said rentee, and the second documentation includes a second checklist about the condition of the rental property.

6. The method of claim 5, further comprising comparing the first checklist to the second checklist to identify the one or more problems related to the condition of the rental property.

7. The method of claim 1, further comprising:
receiving the first documentation from a renter at or before the start of the rental period;
receiving the first documentation from the rentee at or on the start of the rental period;
receiving the second documentation from the renter on or after termination of the rental period;
receiving the second documentation from the rentee on or after termination of the rental period; and
comparing the first documentation from the renter and from the rentee to the second documentation from the renter and the rentee to identify the one or more problems related to the condition of the rental property after the termination of the rental period.

8. The method of claim 1, wherein each of the deductions are flat rate deductions or based on a percentage deduction of a total amount of the deposit.

9. The method of claim 1, further comprising calculating the amount of the deposit that will be returned to the rentee by subtracting one or more of the deductions from the deposit and wherein the calculating provides details about damages occurred to the rental property.

10. The method of claim 1, further comprising receiving, by the server, a third documentation from the rentee about the condition of the rental property at some time after the start of the rental period and before the termination of the rental period.

11. The method of claim 10, further comprising comparing the first documentation, the second documentation and the third documentation to identify the one or more problems related to the condition of the rental property.

12. The method of claim 1, wherein the first documentation and the second documentation are time-stamped with a date and a time of when the first documentation and the second documentation are received by the server.

13. The method of claim 1, wherein the server is connected to one or more communication networks.

14. The method of claim 1, wherein the comparing step is performed by a person using the server.

15. The method of claim 1, wherein the first documentation includes at least one electronic document and at least one image, and the second documentation includes at least one electronic document and at least one image.

16. A method implemented by a server for determining whether a deposit associated with rental property will be returned to a rentee or owed by the rentee, the method comprising:
the server registering an account to be associated with the rentee and identifying an amount of the deposit;
at the commencement of a rental period, the server receiving from a Computer and Camera Unit (CCU), one or more first images comprising geotag, time and date information, wherein the one or more first images are captured in pre-determined directions and orientations at multiple geographical locations of a rental property, and wherein the multiple geographical locations are shown by a Global Positioning System (GPS) of the CCU;
the server associating the one or more first images with the account;
the server receiving from the CCU, one or more second images comprising geotag, time and date information, wherein the one or more second images are captured in pre-determined directions and orientations at multiple geographical locations of the rental property, and wherein the multiple geographical locations are shown by the GPS of the CCU;
the server associating the one or more second images with the account;
the server finding matches between corresponding images from the one or more first images and the one or more second images associated with the account, based on the geotag, time and date information embedded in the one or more first images and the one or more second images;
the server determining differences between the matching corresponding images;
the server determining whether the differences between the matching corresponding images correspond to one or more problems related to the condition of the rental property;
the server assigning values to the differences found between the matching corresponding images;
the server calculating an amount of the remaining deposit amount by subtracting the values from the deposit; and
the server storing the amount of the remaining deposit associated with the account.

17. The method of claim 16, wherein the step of determining whether the differences between the first images and the second images correspond to one or more problems related to the condition of the rental property is performed by a person.

* * * * *